United States Patent [19]

Okamura

[11] Patent Number: 4,513,297
[45] Date of Patent: Apr. 23, 1985

[54] INK JET PRINTER RESERVOIR

[75] Inventor: Shigeru Okamura, Yokohama, Japan

[73] Assignee: Canon Kabushiki Kaisha, Tokyo, Japan

[21] Appl. No.: 496,207

[22] Filed: May 19, 1983

[51] Int. Cl.³ .............................................. G01D 15/16
[52] U.S. Cl. .................................. 346/140 R; 346/75
[58] Field of Search ............................. 346/75, 140 R

[56] References Cited

U.S. PATENT DOCUMENTS 4,115,789 9/1978 Fischbeck ...................... 346/140 R
4,320,406 3/1982 Heinzl .......................... 346/140 R Primary Examiner—E. A. Goldberg
Assistant Examiner—Gerald E. Preston
Attorney, Agent, or Firm—Fitzpatrick, Cella, Harper & Scinto

[57] ABSTRACT

An ink jet printer of an improved construction which includes a platen holding thereon a recording sheet; a container moving along the platen and comprising a container main body which divides its interior into a plurality of ink storing chambers and having an opening common to the ink storing chambers, and a lid to close the common opening; and a plurality of ink jet nozzles provided in the ink storing chambers and to eject ink from the corresponding ink storing chambers.

4 Claims, 3 Drawing Figures

INK JET PRINTER RESERVOIR

BACKGROUND OF THE INVENTION

1. Field of the Invention

This invention relates to an ink jet printer. More particularly, it is concerned with improvement in the construction of an ink tank for the ink jet printer.

2. Description of Prior Art

The construction of a conventional monochromatic ink jet printer is as shown in FIGS. 1 and 2 of the accompanying drawing, in which a reference numeral 1 designates an ink jet nozzle which is made of a glass tube, or the like. A piezoelectric element 2 in a hollow cylindrical form is fitted on and around the outer periphery of this ink jet nozzle 1. The forward distal end of the ink jet nozzle 1 is constricted to form an ejecting nozzle 1a, while the rear distal end part thereof is connected with one end of a tube 3. The other end of the tube 3 is immersed in ink 5 stored in a sub-tank 4 for the ink. A filter 6 is provided on this lower end part of the tube 3. A lid 7 is fitted on the top of this sub-tank 4 to render it air-tight in general. An air layer 4a with a predetermined volumetric space is formed in the top portion of the sub-tank 4.

Further, the sub-tank 4 is connected with one end of a flexible tube 8 through a connecting member (or portion) 8a, while the other end of the flexible tube 8 is connected with a main ink tank (not shown in the drawing). Furthermore, above the connecting member 8a, there is provided another connecting member 9a, to which one end of an ink suction tube 9 is connected. The other end of the ink suction tube 9 is connected to a negative pressure source (not shown in the drawing).

The ink jet nozzle 1 and the sub-tank 4 of the above-described construction are mounted on a carriage (not shown) in opposition to a platen 10. The printing ink is ejected from this ink jet nozzle 1 by contraction of the piezo element 2 upon electric conduction to the piezo element in accordance with a control signal, and the recording is effected on a recording sheet which is held on and led out by the platen 10.

In the ink jet printer of such construction, in order to prevent non-ejection of the ink from the ink jet nozzle 1 from taking place, a contrivance is made such that, when the non-ejecting condition occurs, or immediately before start of the printing operation, a cap (not shown in the drawing) is fitted at the distal end of the nozzle to suck out ink from it, thereby maintaining a regular ink feeding condition at the nozzle end so as to enable accurate printing operation to be carried out every time. Further, the ink 5 within the sub-tank 4 is drawn out by the ink suction tube 9 so as to constantly maintain the top surface of the ink at a level substantially flush with the connecting portion 9a. The suction of the ink is done, in most cases, in synchronism with the recovery operation to get rid of the above mentioned non-ejecting condition of the ink.

The ink jet printer shown in FIGS. 1 and 2 is an example of performing recording operation using a single color such as, for example, black. If, however, polychromatic printing is to be done by use of various colors such as, for example, yellow, cyan, magenta, etc., it becomes necessary, as a matter of course, to provide sub-tanks 4 and ink jet nozzles 1 for the number corresponding to the colors of the ink, each tank having the same structure.

However, when a plurality of sub-tanks are mounted on one and the same carriage, a large space becomes necessary to receive all these sub-tanks and the weight of the carriage as a whole increases with the consequent necessity for use of an electric motor, etc., having a large driving power for drive-control of the carriage. With increase in weight of the carriage as a whole, the inertia of the carriage becomes great accordingly. As the result, a complicated control is needed when the carriage is to be driven to an accurate position or to be caused to start, which disadvantageously results in slowing down the recording speed and in an increased manufacturing cost.

SUMMARY OF THE INVENTION

It is therefore an object of the present invention to provide an ink jet printer provided with an ink reservoir of a small size, and having a low manufacturing cost.

It is another object of the present invention to provide an improved ink jet printer capable of effectively performing polychromatic printing.

It is still another object of the present invention to provide an ink container of a novel construction.

It is another object of the present invention to provide an ink container of a construction in which ink feeding tubes to be connected therewith are made convenient and not cumbersome in assembly.

It is still another object of the present invention to provide an ink jet printer of a simplified construction in its entirety.

The foregoing and other objects as well as specific construction and function of the ink jet printer according to the present invention will become more apparent and understandable from the following detailed description thereof when read in conjunction with the accompanying drawing.

DETAILED DESCRIPTION OF A PREFERRED EMBODIMENT

Figure 1:
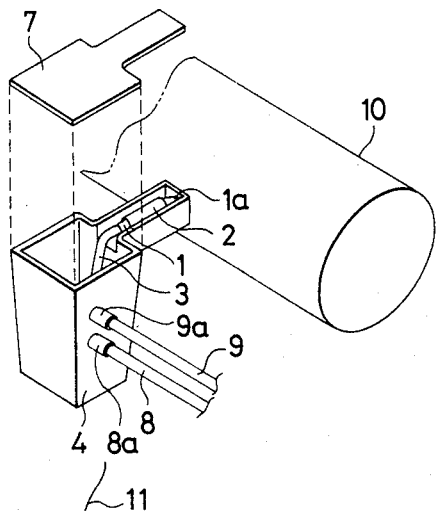
fIGS. 1 and 2 are respectively a perspective view and a longitudinal cross-sectional view for explaining the structure of a conventional ink jet printer.
Figure 2:
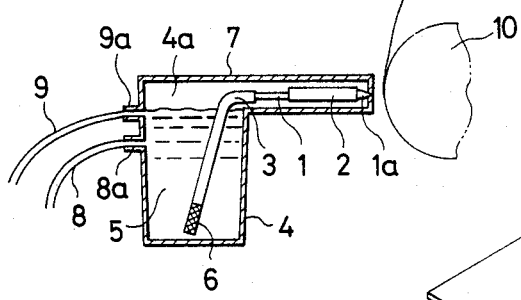
Figure 3:
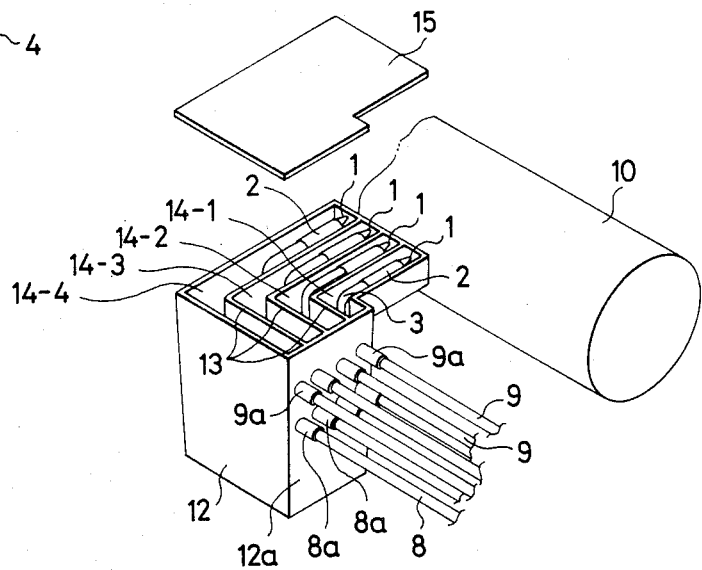
FIG. 3 is a perspective view for explaining one embodiment of the present invention.

In FIG. 3, which explaines one preferred embodiment of the present invention, the same parts as those in FIGS. 1 and 2 are designated by the same reference numerals.

In this embodiment, the sub-tank main body 12 constituting the ink container has a plurality of substantially L-shaped partition walls 13 provided inside thereof, whereby mutually independent and substantially L-shaped ink storing chambers 14-1, 14-2, 14-3 and 14-4 are defined. In each of these ink storing chambers 14-1 to 14-4, ink of different colors such as cyan, magenta, yellow and balck is filled. Individual ink jet nozzle 1 is provided in each in storing chamber in correspondence to the ink of different colors.

The ink jet nozzles 1 are arranged rectilinearly in the direction of the axis of the platen 10, and fixed inside the sub-tank main body 12.

Connector portions 8a are provided on one side wall of the sub-tank main body 12 in correspondence to the ink storing chamber 14-1 to 14-4. One end of the ink feeding flexible tube 8 extending from the main ink tank is connected with this connecting portion 8a.

Above the connector portions 8a, there are also provided separate connector portions 9a, to each of which is connected one end of the ink drawing tube 9 which draws out ink in each of the ink storing chamber.

The sub-tank 12 is mounted on the carriage (not shown) and reciprocates in the axial direction of the platen 10. The abovementioned connectors 8a and 9a are provided on the side wall 12a, the plane of which is perpendicular to the moving direction of the carriage. In this manner, since the tubes 8 and 9 are connected in the direction parallel to the axis of the platen 10, they least hamper the movement of the carriage, hence the printer as a whole can be made meritoriously small in size in its actual assembly. The top surface of the sub-tank main body 12 is fully open outward. This opening is closed by a single common lid or cover 5 to render the interior of the ink storing chambers to be tightly closed. The sub-tank main body 12 is formed by integral molding with inclusion of the partition walls 13, connector portions 8a, 9a, and other component parts as integral parts thereof.

Since the embodiment according to the present invention is constructed as such, a single sub-tank is sufficient for the intended purpose. In addition, when it is shaped with a synthetic resin or like material, various component elements can be integrally formed, which facilitates fabrication of the sub-tank for ink. Moreover, since the interior of the sub-tank is divided into a plurality of ink storing chambers 14-1 to 14-4, each of which receives ink of a different color, there is no necessity for providing a plurality of individual sub-tanks corresponding to each color, hence the printer as a whole can be made small in size and light in weight. With reduction in weight, control of the carriage becomes easy, which makes it possible to use a low-priced motor, and a high speed polychromatic ink jet printer can be manufactured at low cost.

It should be noted that the present invention is not limited to the above-described embodiment, but it may be applied to an ink jet printer which uses the so-called thermal jet type ink nozzle. It is further feasible that the ink jet nozzle be simply fixed on to the carriage without it being accommodated in the sub-tank.

What I claim is:

1. An ink jet printer, comprising:
    (a) a platen for holding thereon a recording sheet;
    (b) an ink container which moves along the axial direction of said platen, said ink container having:
    (1) a container main body, a plurality of partition walls of substantially L-shaped cross-section dividing the interior of said container main body into a plurality of ink storing chambers; and
    (2) an ink feeding tube connected with each of said ink storing chambers in said container main body and arranged in a direction parallel to said axis of said platen; and
    (c) a plurality of ink jet nozzles to eject ink stored in said ink storing chambers, said nozzles being provided in correspondence to said ink storing chambers.

2. The ink jet printer as set forth in claim 1, wherein said plurality of ink storing chambers accommodate therein ink of different colors.

3. The ink jet printer as set forth in claim 1, wherein said plurality of nozzles are fixedly secured in said plurality of ink storing chambers in an arrangement parallel to said axis of said platen.

4. The ink jet printer as set forth in claim 1, wherein said container main body is formed by an integral molding.

* * * * *

UNITED STATES PATENT AND TRADEMARK OFFICE
CERTIFICATE OF CORRECTION

PATENT NO. : 4,513,297
DATED : April 23, 1985
INVENTOR(S) : SHIGERU OKAMURA

It is certified that error appears in the above-identified patent and that said Letters Patent is hereby corrected as shown below:

The left-hand column of the cover sheet does not show
--[30] Foreign Application Priority Data
Japanese Patent Application 88833/1982 dated May 27, 1982--

Column 1, line 66, change "for the" to --in a--.

Column 2, line 41, change "fIGS." to --FIGS.--;
         line 49, change "explaines" to --explains--;
         line 60, change "balck" to --black--;
         line 61, delete "in" (second occurrence).

Column 3, line 6, change "chamber" to --chambers--.

Signed and Sealed this

Eleventh Day of March 1986

[SEAL]

Attest:

DONALD J. QUIGG

Attesting Officer          Commissioner of Patents and Trademarks